Patented Nov. 17, 1953

2,659,739

UNITED STATES PATENT OFFICE 2,659,739

1 - HYDROXY - 4 - β - CYANOPROPYLAMINO-ANTHRAQUINONE AND PROCESS FOR PREPARING SAME

Joseph B. Dickey, Rochester, N. Y., assignor to Eastman Kodak Company, Rochester, N. Y., a corporation of New Jersey No Drawing. Application April 14, 1950, Serial No. 156,049

1 Claim. (Cl. 260—380)

This invention relates to a new anthraquinone compound and its application to the art of dyeing or coloring.

I have discovered that 1-hydroxy-4-β-cyanopropylaminoanthraquinone having the formula:

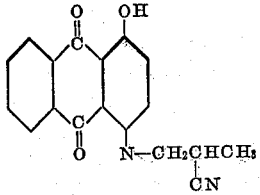

is an unusually valuable dye for the coloration of textile materials made of or containing a cellulose alkyl carboxylic acid ester having two to four carbon atoms in the acid groups thereof. The dye compound when applied to the aforesaid materials gives violet dyeings which have unusually good light and gas fastness properties. Due to the widespread use of cellulose acetate textile materials the compound is primarily of importance in connection with the coloration of such materials.

It is an object of my invention to provide a new anthraquinone dye compound. Another object is to provide a satisfactory process for the preparation of the new anthraquinone dye compound. A further object is to provide dyed cellulose acetate textile materials which possess excellent fastness to light and gas. A still further object is to provide dyed cellulose alkyl carboxylic acid ester textile materials which possess unusually good fastness to light and gas.

By cellulose alkyl carboxylic acid esters having two to four carbon atoms in the acid groups thereof, I mean to include, for example, both hydrolyzed and unhydrolyzed cellulose acetate, cellulose propionate, cellulose butyrate, cellulose acetate-propionate and cellulose acetate-butyrate.

I am aware that U. S. Patent 2,359,381 issued October 3, 1944, to Perkins and Deinet discloses certain anthraquinone compounds containing a cyanoalkylamino group in an α-position of the anthraquinone nucleus. However, so far as I am aware, neither this patent nor any other patent or article discloses the valuable anthraquinone dye compound discovered by me. Further, while all of the compounds specifically disclosed by U. S. Patent 2,359,381 have not been prepared and tested by me, from those that have been prepared and tested it appears that none of the compounds disclosed therein closely approach the utility of my new anthraquinone compound as a dye for cellulose acetate textile materials. To illustrate, the dye compound (1-cyanopentyl-amino-4-hydroxyanthraquinone) of Example 4 of the patent is not nearly as fast to light or gas as the dye compound of the present invention. Similarly, the dye compound (1-methylamino-4-cyanoethylaminoanthraquinone) of Example 10 of the patent is not nearly as fast to light or gas as the dye compound of the present invention. Likewise the dye compound (1,4-di-[β-cyano-ethylamino]-anthraquinone) of Example 11 of the patent which is stated to dye "cellulose acetate in bright blue shades of unusually good fastness to light and atmospheric fading" is not as good as the dye compound of the present invention. While this dye yields dyeings on cellulose acetate textile materials which have very good fastness to light, its affinity for cellulose acetate is not good and the dyeings obtained are not as fast to gas as those obtained with the dye compound of the present invention. Additionally, the dyeings are blue in color rather than violet and accordingly the dyes would not be substitutes for one another even if they otherwise had identical dyeing properties. The marked advantages possessed by the dye compound of the present invention could not have been predicted.

The following examples illustrate the manner of preparation of the new compound of the present invention.

Example 1

16.8 grams (.07 mol) of quinizarin and 7.3 grams (.03 mol) of leucoquinizarin were placed in 300 cc. of n-butyl alcohol and heated to boiling with stirring. Then 8.6 grams of β-cyanopropylamine (0.102 mol) dissolved in 50 cc. of n-butyl alcohol were added slowly over a period of 2 hours. The reaction mixture was refluxed for 6 hours longer, cooled overnight to 0° C.–5° C., filtered and the product collected on the filter was pressed as dry as possible. The dye cake was then dried at 60° C. to obtain 25.5 grams (83% of theory) of 1-hydroxy-4-β-cyanopropylamino-anthraquinone which melted at 149° C.–150° C.

Example 2

16.8 grams (0.7 mol) of quinizarin, 7.3 grams (0.3 mol) of leucoquinizarin, 8.6 grams of β-cyanopropylamine and 350 cc. of isopropyl alcohol were placed in a shaking autoclave, the autoclave was closed and the reaction mixture was heated to 120° C. and maintained at this temperature for 6 hours. The autoclave was shaken throughout the heating period. The reaction mixture was then cooled to 0° C.–5° C., filtered and the product collected on the filter was pressed as dry as possible. The dye cake was then dried at 60° C. to obtain 25 grams of 1-hydroxy-4-β-cyanopropylaminoanthraquinone which melted at 149° C.–150° C.

Experiments show that the color of the dye is considerably affected by the relative amount of leucoquinizarin used. The use of quinizarin and leucoquinizarin in a mol ratio of 7 to 3 appears to be advantageous and is preferred. When the ratio of quinizarin to leucoquinizarin was changed to 6 to 4, for example, the dye was much too blue.

Efforts to run the reaction in water, methyl alcohol or ethyl alcohol gave poor results. When isobutyl alcohol was used as a solvent, the dye obtained was not as bright as when n-butyl alcohol was the solvent, but a 7% higher yield was obtained.

In order that the preparation of 1-hydroxy-4-β-cyanopropylaminoanthraquinone may be entirely clear, the preparation of β-cyanopropylamine, which is believed to be a new compound, is described hereinafter.

*Example 3*

800 cc. of 28% aqueous ammonia and 160.8 grams of methacrylonitrile are charged into a 1300 cc. shaking autoclave. The autoclave is closed and the reaction mixture is heated to 135° C. as rapidly as possible with shaking and kept at 135° C. for two hours. The autoclave was then cooled to room temperature and the reaction mixture was distilled under reduced pressure. 128 grams of β-cyanopropylamine

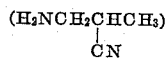

a colorless liquid, boiling at 84° C.–85° C./22 mm. were obtained.

The new anthraquinone dye compound of my invention can be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conduced at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C. for example, following which the temperature is raised to that selected for carrying out the dyeing operation. The temperature at which the dyeing is conducted may, of course, be varied somewhat, depending upon the particular material undergoing coloration. The amount of dye used can be, for example, ⅓% to 3% by weight of that of the textile material although lesser or greater amounts of dye can be used.

I claim:

The anthraquinone compound having the formula:

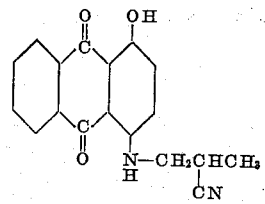

JOSEPH B. DICKEY.

References Cited in the file of this patent

UNITED STATES PATENTS

| Number | Name | Date |
|---|---|---|
| 2,359,381 | Perkins et al. | Oct. 3, 1944 |